United States Patent Office 3,507,812
Patented Apr. 21, 1970

3,507,812
METHOD FOR THE PREPARATION OF MIXED NONNOBLE METAL CATALYSTS
Warren Maxwell Smith, Fred J. Buchmann, Howard Emerson Merrill, and Harry Edwin Robson, Baton Rouge, La., assignors to Esso Research and Engineering Company, a corporation of Delaware
No Drawing. Filed Jan. 23, 1968, Ser. No. 700,681
Int. Cl. B01j 11/40
U.S. Cl. 252—455         10 Claims

ABSTRACT OF THE DISCLOSURE

The present disclosure relates to improved methods for the preparation of a mixed nonnoble metal catalyst. The preparative method of the present invention not only provides a more efficient method of preparing a nonnoble metal catalyst than methods previously known in the art, but also rather unexpectedlly results in a catalyst having substantially higher activity in hydrocarbon conversion processes than a catalyst of the same composition but prepared by methods previously known in the art. The present method involves the following preparative sequence:

(1) Mixing a crystalline alumino-silicate zeolite, in the sodium form, with a binder comprising an inorganic oxide gel and/or a clay and spray drying;
(2) Exchanging the zeolite composite with ammonium ion until a critical level of $Na_2O$ content is reached;
(2) Forming the exchanged zeolite composite to desired shape and size for use in commercial operations;
(4) Treating the catalyst composite pellets with steam;
(5) Cation exchanging the zeolite composite with a metal cation selected from Groups I–B, II–B, or the nonnoble members of Group VIII of the Periodic Table; and
(6) Treating the metal cation exchanged catalyst composite with a hydrogenation component selected from Group V–B or Group VI–B of the Periodic Table.

BACKGROUND OF THE INVENTION

The present invention concerns an improved method for the preparation of catalyst compositions used in petroleum conversion reactions. In particular, the present invention concerns an improved method for the preparation of mixed nonnoble metal catalysts which show unexpectedly high activity in petroleum hydrocarbon conversion reactions occurring in the presence of an added reducing gas, such as hydrogen. More specifically, the present invention relates to a multistep technique for preparing catalyst compositions wherein a crystalline alumino-silicate zeolite, in the sodium form, is mixed with an inorganic oxide binder and spray dried. This material is subjected to an ammonium cation exchange until an optimum level of about 2–4 wt. percent $Na_2O$ in the zeolite is obtained. The ion exchanged zeolite composite catalyst is then pelleted to the desired size and shape and subjected to steam treatment at elevated temperatures. This procedure is then followed by cation exchanging the pelleted, steamed composite with a metal cation selected from Groups I–B, II–B, or the nonnoble metal constituents of Group VIII of the Periodic Table. Then this composite is impregnated with a hydrogenation component selected from Groups V–B or VI–B.

The mixed nonnoble metal catalysts prepared by the technique of the present invention are useful in hydrocarbon conversion processes which require catalysts having a substantial hydrogenation-dehydrogenation activity. These processes include, for example, hydrocracking, hydroforming, hydroisomerization, hydrotreating (both for desulfurization and denitrogenation), hydrodealkylation, disproportionation, hydrogenation, hydrocracking and other related reactions.

It has been known in the art to utilize mixed metal catalyst compositions in various hydrocarbon conversion processes. The early catalysts utilized for this purpose comprised an amorphous catalyst base, such as alumina, which was impregnated with the desired combination of metals in the form of sulfides or oxides. The metal components were generally introduced onto the amorphous support material by wet impregnation of the support with a water-soluble compound of the desired metal or metals. An example of such technique is to be found in U.S. Patents 2,840,529 and 2,983,691. It has also been known to coprecipitate two or more metals from an aqueous solution onto an amorphous support, such as silica-alumina, to prepare catalyst compositions which are useful in various hydrocarbon conversion processes. In this regard, see U.S. Patent 3,147,208 and also U.S. Patent 3,073,777.

It has additionally been known to utilize crystalline alumino-silicate zeolite as catalyst base materials for mixed metal hydrogenation components. U.S. Patent No. 3,259,564 discloses a crystalline synthetic zeolite which is treated by cation exchange with various metals and then is subsequently treated with a noble metal so as to deposit the latter metal thereon. Other crystalline alumino-silicate zeolites have been used as catalyst support materials. For example, in U.S. Patent No. 2,983,670, a faujasite having a silica to alumina mole ratio less than 3 was impregnated with combinations of metals in Groups V–B, VI–B, VII–B, and VIII of the Periodic Table by treating the zeolite with aqueous solutions of the desired metal compounds. The conditions selected for impregnating resulted in little or no exchange of the lattice ions. Both of the aforesaid patents relating to mixed metal-containing zeolite disclose the use of such compositions in hydrocarbon conversion processes.

A specific disclosure of the use of a mixture of a Group VI and a Group VIII metal on a crystalline alumino-silicate is given in U.S. Patents 3,159,564 and 3,265,610. There is no teaching in these patents with respect to the manner in which these metals are introduced onto the molecular sieve carrier.

More recently, it has been suggested in Ser. No. 622,482 filed on Mar. 13, 1967, now U.S. Patent No. 3,392,108, to prepare mixed nonnoble metal crystalline alumino-silicate zeolite catalyst by first cation exchanging the zeolite with a metal cation selected from Groups I–B, II–B, and the nonnoble metal components of Group VIII of the Periodic Table, followed by contacting the exchanged sieve with a solution of a Group V–B or Group VI–B metal so as to form a mixed nonnoble metal component at or near the cation exchange sites in the zeolite.

SUMMARY OF THE INVENTION

The present invention relates to an improved method for preparing mixed nonnoble metal catalyst compositions. The present method involves the following sequential steps:

(1) Mix the crystalline alumino-silicate zeolite base with a binder material and dry, e.g., by spray drying;
(2) Exchange the zeolite composite with ammonium ions to a critical level of sodium oxide content;
(3) Pellet and shape to reactor requirements;
(4) Steam the pelleted composites at elevated temperature;

(5) Cation exchange the treated composite with a metal hydrogenation component; and (6) Add a second nonnoble metal hydrogenation component in anionic form by impregnation utilizing novel techniques for maximizing the amount of metal impregnated in a single step.

Turning first to the initial step of the present method, it is seen that crystalline alumino-silicate zeolites are the preferred catalyst support materials. They are characterized by their highly ordered crystalline structure and uniformly dimensioned pores and are distinguishable from each other on the basis of composition, crystal structure, absorption properties, and the like. The term "molecular sieves" is derived from the ability of the zeolite materials to selectively absorb molecules on the basis of their size and form. The various types of sieves may be classified according to size of molecules which will be rejected (i.e., nonadsorbed) by a particular sieve. A number of these zeolite materials are described, for example, in U.S. Patents 3,013,982–86 wherein they are characterized by a composition and X-ray diffraction characteristics. In addition to their extensive uses as adsorbents for hydrocarbon separation processes and the like, it has recently been found that crystalline alumino-silicate zeolites, particularly after cation exchange to reduce alkali metal oxide content, are valuable catalytic materials for various processes, particularly hydrocarbon conversion processes.

In general, the chemical formula of anhydrous crystalline alumino-silicate zeolites expressed in terms of moles may be represented as:

$$0.9 \pm 0.2 \frac{M_2O}{n} : Al_2O_3 : XSiO_2$$

wherein M is a metal cation; $n$ is its valence; and X is a number from about 1.5 to about 12 or even higher, said value being dependent upon the particular type of zeolite. Zeolites, as synthetically produced or as found naturally, normally, contain an alkali metal, such as sodium or potassium, or an alkaline earth metal, such as calcium. Among the well-known natural zeolites are mordenite, faujasite, chabazite, gmelinite, analcite, erionite, etc. Such zeolites differ in structure, composition, and particularly in the ratio of silica to alumina contained in the crystal lattice structure. Similarly, the various types of synthetic crystalline zeolites, e.g., synthetic faujasite, mordenite, etc., will also have varying silica to alumina mol ratios depending upon such variables as composition of the crystallization mixture, reaction conditions, etc.

For use in hydrocarbon conversion processes, the higher silica to alumina mol ratio zeolites are preferred because of their higher stability at elevated temperatures. Therefore, whereas, the present invention contemplates the use of zeolites in general, those having silica to alumina ratios above 3 will be especially preferred. Typical among these is the synthetic faujasite variety, wherein X in the above formula is about 3 to 7, preferably 3 to 6, most preferably 4.5 to 5.5, and the synthetic mordenite variety, wherein X is about 8 to 12, preferably 9.5 to 10.5.

The binder material utilized in the first step may be a hydrogel of an inorganic oxide or mixtures of several inorganic oxides of types now well known in the art. See U.S. Patent 3,140,249 for suitable examples. Alternatively, the binder may consist of a clay such as kaolin or in yet another embodiment such binder may comprise a mixture of kaolin with the inorganic oxide hydrogel. A particularly preferred binder material is a mixture of silica and alumina such as, for example, 87% silica–13% alumina, which material has been used in the art as a cracking catalyst. The amount of binder material utilized in the preparation of the catalyst composite will generally be in the range of from 15 to 50 wt. percent, based on the finished catalyst, more preferably in the range from about 20 to 40 wt. percent.

It has further been found that mixing the sodium form of the crystalline alumina-silicate zeolite with the binder material in the first step provides certain unexpected advantages in further processing. For example, the filtration characteristics of the zeolite are improved in further handling steps. Furthermore, it has been found that performing the mixing step with the binder as a first step results in an increase in the ease of removing the sodium ion from the zeolite and further cation exchange steps.

The second step involves ammonium ion exchanging the zeolite composite catalysts to a very critical sodium oxide content. This level is generally in the range of from about 1.5 to 6.0 wt. percent $Na_2O$, based on the zeolite, preferably from 2.0 to 4.0 wt. percent sodium oxide. This level of exchange represents the removal of the more easily exchangeable sodium cations and is readily attainable at conventional exchange conditions. It has been found that much more extensive exchange at more severe conditions results ultimately in a less desirable catalyst. This exchange step also removes sodium cations and sulfate anions from the inorganic oxide hydrogel binder added in the first step.

The third step of the present method involves forming the exchanged catalyst composite to the size and shape desired for use in the hydrocarbon conversion reactor. This may involve pilling or extrusion by methods now well known in the art. Such procedures are readily accomplished since the inorganic oxide binder material gives some degree of plasticity to the relatively incompressible crystalline alumino-silicate. If extrusion is to be utilized, an additional amount of a clay such as kaolin may be added for even more plasticity.

In the fourth step of the present method, the shaped and formed catalyst composite material is contacted with steam at elevated temperatures for a period in the range of from about 0.5 to 4 hours. The preferred temperature for this treatment will be in the range of from about 1000 to 1300° F. It has been shown in Ser. No. 552,911, filed May 25, 1966, that such treatment will rearrange the alumino-silicate zeolite crystalline structure to yield a new form which has a higher silica to alumina mole ratio and which, therefore, is even more stable to subsequent conditions of hydrocracking catalyst use such as during regeneration. It has also been unexpectedly found that steam treatment makes the residual sodium ions more readily removable than they were originally and therefore makes it possible to reach desirable lower sodium oxide levels with just one additional exchange using the hydrogenation metal cation.

Step 5 involves the addition of a metal cation hydrogenation component by means of cation exchange using the salts of the metal, e.g., the chloride, nitrate, sulfate, etc. For the purpose of the present invention, the metal cation hydrogenation component is selected from Groups I–B, II–B, or the nonnoble metal constituents of Group VIII of the Periodic Table (Handbook of Chemistry and Physics, 38th edition, Chemical Rubber Publishing Co.). Particularly desirable cationic metals include copper, zinc, cadmium, iron, cobalt, and nickel.

The final step in the present invention procedure involves the addition of a second nonnoble metal selected from Groups V–B and VI–B of the Periodic Table. Particularly preferred metals from these groups comprise molybdenum and tungsten. These materials are conveniently added by impregnation with the metal present in the anionic form. Three alternative procedures may be employed in this final step.

The first alternative procedure is particularly useful when tungsten is then second nonnoble metal. It should be noted that tungsten is commercially available primarily as the paratungstate, usually with ammonium as the cation. This material is of extremely low solubility in water. It has been found, however, that tungsten may be incorporated into the metal cation exchanged zeolite catalyst composition by contacting said composite with a hot dilute solution of ammonium paratungstate whereby the tungsten thus incorporated into the catalyst is not removable by washing with even hot water. It has further been discovered that the amount of tungsten adsorbed on the catalyst is a function of time of contacting with the hot paratungstate solution, unexpectedly increasing to a maximum in the period of about 2 to 5 hours contacting, and about 70° C. and thereafter decreasing and lining out at a much lower level. Thus, when utilizing hot dilute solutions of the ammonium paratungstate, a critical contacting time has been observed.

In an alternative procedure, it has been found that the anionic nonnoble metal constituent, with particular reference to tungsten, can be incorporated in aqueous solution in high concentration by adding a lower alkyl hydroxyamine to the water. For example, concentrated solutions of alkali-free tungsten suitable for preparing supported tungsten catalysts, according to the present invention, may be prepared by dissolving ammonium paratungstate, tungstic oxide or tungstic acid in a mixture of ethanolamine, diethanolamine, or triethanolamine and water. Stable solutions of 50 wt. percent or more tungsten are easily obtainable using from two to six moles, preferably about two moles, of the lower alkyl hydroxyamine per mole of tungsten. From a practical standpoint, the monoethanolamine is the additive of preference since this material leaves less organic matter to be burned out of the catalyst during calcination.

The third alternative method of adding tungsten is by impregnation with ammonium metatungstate.

It has further been found that the activity and effectiveness of the mixed nonnoble metal containing molecular sieves prepared by the hereinabove described technique can be substantially improved by contacting them with sulfur or sulfur-containing compounds either prior to their use in hydrocarbon conversion processes or by conducting the conversion process in the presence of sulfur or sulfur-containing compounds. The catalyst is preferably sulf-activated by contact either with sulfur-containing feed or, if the feed has a low sulfur content, with hydrogen sulfide or an added sulfur compound which is readily convertible to hydrogen sulfide at the conditions employed, e.g., carbon disulfide and the like. The extent of this sulf-activation treatment should be sufficient to incorporate about 0.5 to 15 wt. percent sulfur into the zeolitic catalyst composite.

DESCRIPTION OF THE PREFERRED EMBODIMENT

The preferred embodiment of the present invention will be more clearly understood by reference to the following examples.

Example 1

This example demonstrates the preparation of a nickel tungsten or hydrogen faujasite catalyst by the procedure of the present invention.

Step 1.—A total of 8900 grams of sodium faujasite (40.8 wt. percent solids—equivalent to eight pounds of dry solids) was mixed with an additional 1500 g. of deionized water to give about a 35 wt. percent dry solids slurry. The mixture was run through a colloid mill twice to give good dispersion. A total of 7983 g. of a cracking catalyst hydrogel (13 wt. percent solids containing about 13 wt. percent $Al_2O_3$—equivalent to about 2 lbs. of dry, soda-free, silica-alumina binder) was mixed with an additional 2500 cc. of water and this mixture run through a colloid mill twice. The two water slurries were then admixed well by conventional stirring. The pH of the mixed slurry was adjusted to 5.5–6.0 with dilute $H_2SO_4$ and the resulting mixture was filtered and dried.

Step 2.—The above dried solids were $NH_4^+$ exchanged by contacting with 9070 g. of ammonium nitrate dissolved in 38 liters of water for 3 hours at about 80° F. After exchange, the solids were filtered and washed by reslurrying in water (about 10 wt. percent solids in the slurry) and filtering. Additional exchanges may be made exactly like the first except a temperature of about 150° F. should be used. After the final exchange and one water wash, a second wash is desirable by reslurrying the solids in deionized water with the pH adjusted to 9–10 with ammonium hydroxide. Finally, the washed solids were filtered and dried.

Step 3.—The dried solids were heated for four hours at 1100° F. in the presence of steam at one atmosphere. The temperature was reduced to about 300° F. in steam and then to room temperature in ambient air.

Step 4.—The steamed powder was pelleted to produce pills of a size of ⅛″ x ⅛″ or less. It is possible to reverse this step with Step 3 with the choice of the order of these two steps being dependent on the ease of handling the respective forms of the catalyst.

Step 5.—The pills were then nickel exchanged by contacting about 4540 g. (dry basis) of the above pills with a solution containing about 1134 grams of $$Ni(NO_3)_2 \cdot 6H_2O$$

in about 22.7 liters of water for one hour at 150° F. The exchanged pills were separated from the nickel exchange solution, washed essentially nitrate-free with low cation water, and dried at about 300° F.

Step 6.—The dried pills were impregnated with a tungstate solution made by solubilizing about 708 g. of ammonium paratungstate in about 330 g. of monoethanolamine and the appropriate amount of water to make an amount of solution that can be totally and uniformly imbibed by the pills. This amount of solution is dependent on the degree of drying achieved in Step 5. The treated pills were dried and calcined prior to use.

A catalyst prepared in this fashion will typically contain about 0.8 to 1.5 wt. percent Ni, about 10% W and about 0.5 to 1.2% $Na_2O$.

Example 2

This example demonstrates that the sodium content of the crystalline alumino-silicate zeolite can be more effectively exchanged out with ammonium ion by first mixing the zeolite with an inorganic oxide gel binder. In this example a sodium faujasite was mixed with varying amounts of an inorganic oxide gel comprising 87 wt. percent silica and 13 wt. percent alumina and these composites were then subjected to ammonium ion exchange with ammonium nitrate solution, at the conditions given for ammonium exchange in Example 1, Step 2.

The sodium oxide content of the undiluted faujasite and the various diluted faujasite samples were tested after a first, second, third and fourth exchange with the ammonium salt. The results obtained are summarized in Table I.

TABLE I
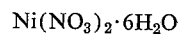

| Base: | | | |
|---|---|---|---|
| Faujasite | 100 | 80 | 60 |
| 3A hydrogel | 0 | 20 | 40 |
| $Na_2O$, Wt. percent after— | | | |
| 1st exchange | 4.3 | 4.7 | 4.7 |
| 2nd exchange | 3.2 | 2.4 | 2.3 |
| 3rd exchange | 2.6 | 1.1 | |
| 4th exchange | 2.1 | 0.5 | |

[1] All sodium contents are calculated based on faujasite only assuming no $Na_2O$ on the diluent.

Examination of the above table clearly demonstrates that the faujasite samples which were mixed with an inorganic oxide gel prior to ammonium ion exchange reached the desired lower levels of sodium oxide content more rapidly than was observed for the faujasite alone.

Example 3

This example demonstrates the criticality involved in ammonium ion exchanging only to an intermediate soda level prior to steaming and further demonstrates the unexpected results arising from the steaming step. This example utilizes sodium faujasite as the crystalline alumino-silicate zeolite and a mixture of 87% silica and 13% alumina as the binder material. Catalysts A and B of Table II were prepared by the procedure outlined in Example 1 using 80% sodium faujasite and 20% binder. These composites were then treated with 4 and 3 ammonium cation exchanges, respectively. The exchanged composites were examined for sodium oxide content and for relative crystallinity. The samples were then subjected to contact with steam for 4 hours at 1100° F. The relative crystallinity and unit cell sizes of each of the samples were determined. The steamed faujasite catalyst composites were then treated with nickel nitrate solution to yield 0.8 to 1.5 wt. percent nickel on the catalyst. The weight percent of sodium oxide remaining on the zeolite after the nickel exchange was then determined. Finally, the nickel form of the faujasite catalytic composite was impregnated with 10 wt. percent of tungsten (based on final catalyst) by the technique described in Example 1, Step 6.

Each of the catalyst samples obtained by the procedures disclosed above was then tested for hydrocracking activity.

Feed for the hydrocracking tests was a highly hydrofined light catalytic cycle oil (boiling from about 400–650° F.) spiked with thiophene equivalent to 0.3 wt. percent S and with n-butylamine equivalent to 0.1 wt. percent N. Operating conditions were approximately 1500 p.s.i.g., 8000 cu. ft. of $H_2$/bbl., one V/hr./V, and temperatures in the range of 675–700° F.

The data associated with the above preparations and runs are summarized below in Table II.

TABLE II

| Catalyst | A | | B | |
|---|---|---|---|---|
| Starting composition: | | | | |
| Percent Na-faujasite | 80 | | 80 | |
| Percent binder (87% $SiO_2$ 13% $Al_2O_3$) | 20 | | 20 | |
| No. of $NH_4^+$ exchanges (final pH=8) | 4 | | 3 | |
| Wt. percent $Na_2O$ (faujasite only) | 0.5 | | 2.4 | |
| Rel. crystallinity [1] | 150 | | 167 | |
| Steaming Conditions [2] | Steamed | Not steamed | Steamed | Not steamed |
| Rel. Crystallinity | | | | |
| Total composition | 76 | 150 | 144 | 167 |
| Faujasite only | 95 | 187 | 180 | 209 |
| Unit cell size, A | 24.43 | 24.76 | 24.47 | 24.73 |
| Wt. percent $Na_2O$ after $Ni^{++}$ exchange | 0.4 | 0.4 | 0.5 | 1.4 |
| Rel. hydrocracking Act. after impregnation with 10 wt. percent W: [3] | | | | |
| Based on total catalyst | 200 | 115 | 360 | 200 |
| Based on faujasite only | 250 | 145 | 450 | 250 |

[1] Calculated from the average height of the ten strongest peaks in the X-ray diffraction pattern divided by the average height of the same peaks as measured with a standard catalyst, multiplied by 100.
[2] Powder steamed before pilling; steamed four hours at 1,100° F.
[3] Calculated from the space velocity used in the test divided by the space velocity that would be required at otherwise the same process conditions with a standard control catalyst to give the same conversion, multiplied by 100.

The data of Table II indicates that it is not desirable to reduce the soda level by exchange to too low a level. Reducing the soda level to no less than 2 wt. percent prior to the steam treatment produced Catalyst B, almost twice as active as Catalyst A initially exchanged to 0.5 wt. percent $Na_2O$ but otherwise similarly treated. The data of Table II also show the benefits in catalyst activity to be derived by incorporating a treatment with steam in the catalyst preparation step. Omitting the steam treatment step with all other preparation conditions identical results in a catalyst with considerably lower activity—almost a 50% loss in activity.

Example 4

This example establishes the desirable range of soda content prior to steam treatment in order to obtain hydrocracking catalysts of best activity. Catalysts C–G of this example were all prepared as in Example 1 except that (1) 87% $SiO_2$–13% $Al_2O_3$ and/or kaolin in varying amounts were used in conjunction with the sodium faujasite, (2) the $NH_4^+$ exchanged powder was pelleted prior to the steam treatment, and (3) the pellets were steamed for only one hour at 1100° F. Table III gives the physical and chemical properties of these catalysts and also their hydrocracking performance. As a consequence of differences arising from steaming pellets vs. powder for only one hour instead of 4 hours, it will be noted that Catalyst C of Table III is somewhat less active than Catalyst B of Table II. However, among the catalysts of Table III it appears that $NH_4^+$ exchanging the various starting compositions to soda levels in the range of 2–6 wt. percent $Na_2O$ prior to the steam treatment produced hydrocracking catalysts of satisfactory activity.

TABLE III

| Catalyst | C | D | E | F | G |
|---|---|---|---|---|---|
| Starting composition: | | | | | |
| Percent Na-faujasite | 80 | 60 | 60 | 60 | 40 |
| Percent binder (87% $SiO_2$–13% $Al_2O_3$) | 20 | 40 | 0 | 20 | 20 |
| Percent binder (kaolin) | | | 40 | 20 | 40 |
| No. of $NH_4^+$ exchanges (final pH=8) | 2 | 2 | 1 | 1 | 1 |
| Wt. percent $Na_2O$ (faujasite only) | 2.8 | 2.2 | 4.7 | 5.8 | 5.2 |
| Steaming Conditions | One hour at 1,100° F. on pilled catalyst | | | | |
| Rel. Crystallinity [1] | | | | | |
| Total composition | 101 | 90 | 80 | 158 | 95 |
| Faujasite only | 126 | 150 | 133 | 263 | 237 |
| Unit cell size, A | 24.48 | 24.53 | 24.61 | 24.60 | 24.54 |
| Wt. percent $Na_2O$ after $Ni^{++}$ exchange | 0.6 | 0.7 | 1.1 | 1.4 | 0.8 |
| Rel. hydrocracking Act. after impregnation with 10 wt. percent W: [2] | | | | | |
| Based on total catalyst | 260 | 280 | 260 | 260 | 260 |
| Based on faujasite only | 320 | 470 | 430 | 430 | 650 |

[1] Calculated from the average height of the ten strongest peaks in the X-ray diffraction pattern divided by the average height of the same peaks as measured with a standard catalyst, multiplied by 100.
[2] Calculated from the space velocity used in the test divided by the space velocity that would be required at otherwise the same process conditions with a standard control catalyst to give the same conversion, multiplied by 100.

Example 5

This example demonstrates the criticality in the contact time when utilizing dilute solutions of ammonium paratungstate to incorporate tungsten into a nickel exchanged faujasite. Two catalysts were prepared and, during the preparation, samples were taken at various times to analyze for nickel and tungsten. In the first catalyst, 200 grams by weight of a nickel exchanged synthetic faujasite having a sodium oxide level of 2.0 wt. percent and a silica to alumina mole ratio of 4.9 were contacted with two liters of a solution containing 31.5 grams of ammonium paratungstate. Samples were taken after 2, 5, 27 and 46 hours contacting at 70° C. The samples were washed thoroughly with hot water, dried and analyzed.

In the second catalyst, 164 grams of a similar nickel exchanged synthetic faujasite were contacted with two liters of a solution of 25.9 grams of ammonium paratungstate. Samples were taken after five minutes and two hours contacting at 70° C., washed with hot water, dried, and analyzed for nickel and tungsten. The analysis below, given in Table IV, shows that tungsten content increased up to about two hours and then decreased as contact time was further increased.

TABLE IV

| Catalyst | 1 | | | | 2 | |
|---|---|---|---|---|---|---|
| Contact time hrs | 2 | 5 | 27 | 46 | 0.08 | 2 |
| Wt. percent W | 6.9 | 6.6 | 2.1 | 2.1 | 0.25 | 9.1 |
| Wt. percent Ni | 8.2 | 6.3 | 6.0 | 6.4 | 6.2 | 6.7 | 6.8 | 6.6 |

The results of these experiments show that tungsten is chemically bound to the catalyst surface by reaction with the nickel exchanged faujasite. This is indicated by the fact that it cannot be removed by thorough washing with hot water under conditions where ammonium paratungstate is completely soluble. This reaction takes longer than five minutes but is essentially complete in two hours under the conditions described. More extended contacting results in a competing reaction which solubilizes the tungsten, probably by conversion to a metatungstate species. It is well known that ammonium paratungstate can be converted to ammonium metatungstate by prolonged heating. To show that insoluble tungsten species are not formed on the catalyst surface by reaction with ammonium metatungstate in dilute solution, a sample of a nickel exchanged faujasite similar to those described above was treated with a dilute solution of ammonium metatungstate for one hour at 70° C. and the resulting catalyst, after thorough washing with hot water, contained less than 0.02 wt. percent tungsten.

What is claimed is:

1. An improved process for the preparation of mixed nonnoble metal containing alumino-silicate zeolite catalyst, said process comprising, in combination:
   (A) admixing a crystalline alumino-silicate zeolite in the sodium form with an inorganic binder material;
   (B) treating the said catalyst composite with ammonium ion solution until the $Na_2O$ level, based on the zeolite, is in the range from about 2 to about 6 wt. percent;
   (C) shaping and pelleting the exchanged catalyst composite;
   (D) treating the catalyst composite pellets with steam at elevated temperatures;
   (E) exchanging the steamed zeolite composite with a metal cation selected from Groups I-B, II-B, or the nonnoble members of Group VIII of the Periodic Table; and
   (F) treating the metal cation exchanged catalyst composite with hydrogenation component in anionic form in solution, said hydrogenation component being selected from compounds of Group V-B or VI-B of the Periodic Table, whereby a mixed nonnoble metal catalyst of superior activity is obtained.

2. The process of claim 1 wherein said crystalline alumino-silicate zeolite is a synthetic sodium faujasite and said binder material is selected from the class consisting of clays and inorganic oxide gels.

3. The process of claim 1 wherein the steaming procedure of step (C) is conducted for a period ranging from 0.5 to 4 hours and at a temperature in the range of from about 1000° to 1300° F.

4. The process of claim 1 wherein said metal cation hydrogenation component is nickel.

5. The process of claim 1 wherein said second nonnoble metal in anionic form comprises a compound of tungsten.

6. The process of claim 5 wherein said tungsten is incorporated into the zeolite catalyst composite in the form of a hot, dilute solution of ammonium paratungstate which is contacted with said zeolite catalyst composite for a period in the range of from 2 to 5 hours whereby said tungsten is introduced into said composite in a form whereby it is not removable by washing with hot water.

7. The process of claim 5 wherein said tungsten compound is added in the form of a stable highly concentrated solution of tungsten compound in aqueous solution containing a lower alkyl hydroxy amine.

8. The process of claim 7 wherein said tungsten compound is selected from the group consisting of ammonium paratungstate, tungstic oxide and tungstic acid, said lower alkyl hydroxy amine is selected from the group consisting of ethanolamine, diethanolamine and triethanolamine and said lower alkyl hydroxy amine is present in an amount equivalent to from 2 to 6 moles of said hydroxy amine per mole of tungsten.

9. The process of claim 5 wherein said tungsten compound is added by impregnation with ammonium metatungstate.

10. An improved method of preparing a nickel-tungsten on hydrogen faujasite catalyst, said method comprising the following steps, in combination:
    (A) admixing a sodium synthetic faujasite with an inorganic binder material wherein said binder material will comprise from 15 to 50 wt. percent of said catalyst composite;
    (B) exchanging said catalyst composite with a solution of ammonium nitrate until the $Na_2O$ level, based on the zeolite, is in the range of from about 2 to 4 wt. percent;
    (C) treating the exchanged catalyst composite with steam for a period of 0.5 to 4 hours at a temperature in the range of from about 1000° to 1300° F.;
    (D) pelleting the steamed catalyst composite to the desired shape and size;
    (E) exchanging the steamed composite with a solution of nickel nitrate to yield from 0.8 to 1.5 wt. percent nickel based on total catalyst composite;
    (F) impregnating a nickel exchanged catalyst composite with a solution of ammonium paratungstate in aqueous monoethanolamine, the amount of said solution being just sufficient to totally and uniformly wet the composite whereby about 10% by weight of tungsten, based on the composite, is introduced, said process producing a catalyst of superior activity in hydrocarbon conversion reactions.

References Cited

UNITED STATES PATENTS

| | | | |
|---|---|---|---|
| 3,391,088 | 7/1968 | Plank et al. | 252—455 |
| 3,392,108 | 7/1968 | Mason et al. | 252—455 X |
| 3,413,238 | 11/1968 | Gladrow et al. | 252—455 |
| 3,415,760 | 12/1968 | Hadley et al. | 252—438 X |

DANIEL E. WYMAN, Primary Examiner

C. F. DEES, Assistant Examiner

U.S. Cl. X.R.

23—112; 252—438, 458